United States Patent Office 3,705,882
Patented Dec. 12, 1972

3,705,882
LIQUID THIOESTER-TERMINATED POLYMERS
Douglas E. Skillicorn, Avon Lake, Ohio, assignor to The B. F. Goodrich Company, New York, N.Y.
No Drawing. Filed June 28, 1971, Ser. No. 157,601
Int. Cl. C08g 23/00
U.S. Cl. 260—79   12 Claims

ABSTRACT OF THE DISCLOSURE

Liquid thioester-terminated polymers are prepared by reacting liquid mercaptan-terminated polymers with anhydrides, esters, or carboxylic acids. The polymers are readily cured to form solid elastomers, and are useful base polymers for sealants, caulks, and like formulations. These polymers do not have the typical offensive odor of mercaptan-containing polymers, and so they are especially useful in applications where the odor of mercaptan-containing polymers prohibits their use.

BACKGROUND OF THE INVENTION

Mercaptan-terminated liquid polymers and liquid polymers containing pendant mercaptan groups are well known in the art. The ease and versatility with which they can be cured to elastomeric solids makes them desirable base polymers for sealant, caulk, adhesive and like formulations. A common disadvantage of all mercaptan-containing liquid polymers, no matter how they are prepared, is their characteristic offensive mercaptan odor. This odor will often prevent them from being used in applications and in areas where the odor would be confined as, for example, in a closed room.

SUMMARY OF THE INVENTION

It has now been discovered that liquid mercaptan-containing polymers, having carbon-carbon linkages in their backbone, can be reacted with a compound containing an acyloxy

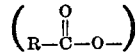

structure to form liquid thioester-containing polymers which do not have a typical, offensive mercaptan odor. The thioester-containing polymers are readily cured to form solid elastomers, and are useful base polymers for caulks, sealants, and like formulations. The polymers are cured by reacting the thioester structures with an amine and a mercaptan vulcanizing agent. In this manner the mercaptan odor is minimized.

DETAILED DESCRIPTION

All liquid polymers containing terminal and/or pendant mercaptan groups wherein the polymer backbone consists of saturated and/or unsaturated carbon-carbon linkages can be employed in this invention. Preferred are those liquid polymers, having backbones containing polymerized units of vinylidene (CH$_2$=C<) monomers, which are characterized by having mercaptan contents ranging from about 0.2 percent to about 10 percent by weight based upon the weight of the polymer and bulk viscosities, as measured at 27° C. with a Brookfield model LVT viscometer using spindle #7 at 1 to 100 r.p.m. ranging from about 400 cps. to about 4,000,000 cps. Preferred liquid polymer backbones containing polymerized units of conjugated dienes such as 1,3-butadiene, isoprene, 2-n-heptyl-1,3-butadiene, and the like; monoolefins such as ethylene, isobutylene, 1-butene, and the like; monoolefinically unsaturated nitriles such as acrylonitrile, methacrylonitrile, crotonitrile, and the like; vinyl esters such as vinyl acetate, vinyl benzoate, and the like; vinyl ethers such as vinyl methyl ether, vinyl n-butyl ether, and the like; allyl esters such as allyl propionate, allyl benzoate, and the like; allyl ethers such as ally methyl ether and the like; acrylates of the formula

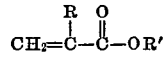

wherein R is —H, —CH$_3$, or —C$_2$H$_5$ and R' is an alkyl group containing 1 to 18 carbon atoms or an ether group containing no more than 5 carbon atoms, whereas preferred acrylates are those where R is —H and R' is an alkyl group of 1 to 8 carbon atoms, such as ethyl acrylate, butyl acrylate, and the like; and combinations thereof.

Examples of preferred liquid mercaptan-terminated polymers include mercaptan-terminated polyacrylates as prepared in accordance with procedures in U.S. Pat. 3,580,830; and mercaptan-terminated dienic polymers prepared in accordance with procedures in U.S. Pat. 3,449,301.

The liquid mercaptan-containing polymers can be reacted with compounds containing an acyloxy

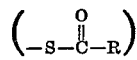

structure in the presence of an acid catalyst to form the structure

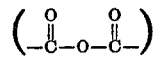

Useful compounds containing acyloxy structures are anhydrides, esters, and carboxylic acids.

Useful anhydrides contain at least one unit of the structure

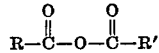

Such anhydrides include the simple acid anhydrides; anhydrides where the two carbonyl groups of the above structure are connected to a common ring structure as in phthalic anhydride, pyromellitic anhydride, cyclohexane-dicarboxylic anhydride, and the like; and anhydrides wherein the above structure is part of a ring structure as in succinic anhydride, glutaric anhydride, and the like. The preferred anhydrides are the simple acid anhydrides of the formula $$\underset{\mathrm{R-C-O-C-R'}}{\overset{\mathrm{O\ \ \ \ \ \ O}}{\underset{\|\ \ \ \ \ \ \|}{}}}$$

wherein R and R' are alkyl, aryl, alkaryl, aralkyl, alkoxy, or cycloalkyl groups containing 1 to 12 carbon atoms. Typical examples of such acid anhydrides are acetic anhydride, propionic anhydride, isobutyric anhydride, n-caproic anhydride, acetic propionic anhydride, toluic anhydride, β-naphthoic acetic anhydride, benzoic anhydride, mono-o-methoxy-benzoic anhydride, and p-ethoxybenzoic anhydride. Preferred simple acid anhydrides are those wherein the R and R' groups are alkyl groups containing 1 to 5 carbon atoms.

Useful esters contain at least one

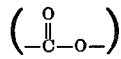

structure. Such esters include the simple organic esters; the diesters such as diethyl oxalate, diethyl malonate, diethyl succinate, dibutyl adipate, and the like; the ortho esters such as ethyl orthoformate, ethyl orthoacetate, and the like; the dialkyl carbonates such as diethyl carbonate; and waxes and glycerides. The preferred esters are the simple organic esters of the formula

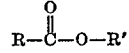

wherein R and R' are defined as above. Typical examples of such esters are methyl formate, ethyl formate, cyclopentyl formate, ethyl acetate, isopropyl acetate, tert-butyl acetate, cyclohexyl acetate, n-octyl acetate, ethyl diethyl acetate, phenyl acetate, t-butyl isobutyrate, ethyl β-cyclohexyl propionate, t-butyl isovalerate, methyl benzoate, isopropyl benzoate, benzyl benzoate, phenyl isobutyrate and ethyl 2-phenylcyclopropane carboxylate. Preferred simple organic esters are those wherein the R and R' groups are alkyl groups containing 1 to 5 carbon atoms.

Useful carboxylic acids contain at least one

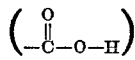

structure. Such acids include the monocarboxylic acids; the dibasic acids such as oxalic acid, malonic acid, adipic acid, and the like, and phthalic acid, pyromellitic acid, cyclohexane dicarboxylic acid, and the like; and the hydroxy acids such as hydroxyacetic acid, lactic acid, glycolic acid, malic acid, tartaric acid, and the like. The preferred carboxylic acids are the monocarboxylic acids of the formula $$R-\overset{O}{\underset{\|}{C}}-O-H$$

wherein R is defined as above. Typical examples of such carboxylic acids are acetic acid, propionic acid, isobutyric acid, isovaleric acid, heptonoic acid, hexadeconoic acid, methyl ethyl acetic acid, t-butyl acetic acid, 2,6-dimethyl heptanoic acid, cyclopropane carboxylic acid, cyclopropylacetic acid, benzoic acid, o-toluic acid, and o-tolylacetic acid. Preferred monocarboxylic acids are those wherein the R group is an alkyl group containing 1 to 5 carbon atoms.

The liquid thioester-terminated polymers obtained have a weight percent content of the thioester linkage

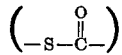

ranging from about 0.2% to about 18% based upon the total weight of the polymer. The thioester grouping,

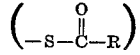

where R is defined as above, has a weight percent content, dependent upon the R group, ranging from about 0.2% to about 70% by weight of the polymer.

Liquid thioester-terminated polymers prepared using the preferred liquid mercaptan-terminated polymers include polymers containing from about 15 percent to about 94 percent by weight of butadiene, about 5 percent to about 37 percent by weight of acrylonitrile, and about 1 percent to about 12 percent by weight of thioester, all based upon the weight of the polymer; and polymers containing from about 11 percent to about 61 percent by weight of ethyl acrylate, about 4 percent to about 88 percent by weight of an acrylate of the formula

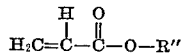

wherein R'' is an alkyl radical of 1 to 8 carbon atoms, and a thioester content of from about 1 percent to about 9 percent by weight, all based upon the weight of the polymer. More preferred polymers of the type wherein the polymeric backbone consists of acrylate(s) are polymers containing from about 11 percent to about 24 percent by weight of ethyl acrylate, about 54 percent to about 75 percent by weight of normal butyl acrylate, and about 1 percent to about 9 percent by weight of thioester.

The acyloxy structure may also be present as pendant groups on the liquid mercaptan-containing polymer itself, or may be present as groups on another polymer not containing mercaptan groups. Examples of such polymers are the mercaptan-terminated liquid polymers prepared in accordance with the procedures of U.S. Pat. 3,580,830, which contain pendant ester groups introduced by the use of acrylate monomers in the polymerization; and the carboxyl-terminated liquid dienic polymers prepared in accordance with U.S. Pat. 3,285,949. Other liquid polymers containing the desired acyloxy structure may be prepared by using acrylic acid, crotonic acid, maleic acid, and the like as comonomers in the polymerization of the polymer. The reaction produces inter- and intra-molecular thioester linkages. The liquid thioester-containing polymers obtained have weight percent contents of the thioester linkage

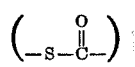

ranging from about 0.2% to about 18% based upon the weight of the polymer.

The compounds containing the acyloxy structure vary in their ease of reaction with mercaptan groups. Carboxylic acids react the slowest of the three types with mercaptan groups. Anyhdrides react the fastest of the three types with mercaptan groups, and, thus, the reaction can be performed at the lowest temperatures. In this sense the anhydrides are the preferred compounds containing the acyloxy structure.

The amount of acyloxy-containing compound used ranges from about 0.5 mole of acyloxy to every 1 mole of mercaptan to about 10 moles of acyloxy to every 1 mole of mercaptan contained in the polymer. While levels used higher than 10 moles of acyloxy to 1 mole of mercaptan may be used to react with the mercaptan this is not necessary. A preferred range of acyloxy to use is from about 1 mole to about 5 moles to every 1 mole of mercaptan.

The acid catalysts used include the mineral acids such as hydrochloric acid and phosphoric acid or the strong organic acids such as o-sulfo-benzoic acid, dodecyl benzene sulfonic acid, and the like. The preferred acid catalyst is dodecyl benzene sulfonic acid. The amount of acid used ranges from about 0.1 part to about 10 parts by weight based on 100 parts by weight of the mercaptan-containing polymer. A more preferred range is from about 0.5 part to about 3.0 parts by weight per 100 parts by weight of polymer.

Temperature of reaction ranges from about 20° C. to about 260° C. The temperature used for the reaction is a function of what type of acyloxy compound is used and of the acid catalyst level. As an example, a reaction involving the use of an acid anhydride, an acid catalyst level of about 1.0 part by weight, and a liquid mercaptan-containing polymer can be readily performed at 110° C. to yield the desired liquid thioester-containing polymer in about one hour. Higher temperatures and/or longer times would be required if esters or carboxylic acids were used or if a low catalyst level was used.

The reaction can be performed in a bulk or a solution process. Useful solvents are those which are capable of dissolving the liquid polymers and the ingredients. Suitable solvents are toluene, benzene, and hexane.

The thioester-containing liquid polymer is readily prepared. The liquid polymer is charged to a reactor vessel equipped for agitation. The polymer either contains mercaptan groups or groups capable of forming mercaptan groups in situ upon the application of heat as do the xanthate-terminated polymers prepared in accordance with the procedures of U.S. Pats. 3,449,301 and 3,580,830. The acyloxy-containing compound is charged to the reactor vessel. A solvent may be charged, or the liquid polymer and the ingredients may be predissolved in a solvent prior to charging. The acid catalyst is charged, the ingredients agitated, and the temperature raised to the required temperature. The conversion can be followed by taking aliquots during the reaction and analyzing for the mercaptan content of the polymer.

Usually more than 50% conversion of the mercaptan groups to thioester groups will improve the odor of the polymer, while about 90% conversion of mercaptan groups to thioester groups renders the polymer essentially odorless.

The reaction may be performed open to the atmosphere, under conditions of reflux, or it may be performed in sealed vessels under a nitrogen atmosphere or under a vacuum. When the mercaptan groups are formed in situ by the pyrolysis of xanthate groups to mercaptan groups it is preferable to perform the reaction under a vacuum to rid the reactor of gaseous pyrrolysis by-products.

The thioester-containing liquid polymers can be recovered by coagulating the polymer solutions with water, methanol, isopropyl alcohol, or water/alcohol solutions. The polymers can also be recovered by putting the polymer solutions under a vacuum and heating to distill off the solvent and unreacted ingredients. Prior to final drying a base such as potassium hydroxide may be added to neutralize the acid catalyst.

The liquid thioester-containing polymers are characterized by having bulk viscosities as measured at 27° C. with a Brookfield model LVT viscometer using spindle #7 at 0.5 to 100 r.p.m. ranging from about 400 cps. to about 8,000,000 cps. A useful bulk viscosity range for many applications is from about 5,000 cps. to about 200,000 cps.

If an acyloxy-containing compound was added as a separate ingredient, the bulk viscosity of the recovered thioester-containing polymer may be similar to that of the original mercaptan-containing polymer. If the original polymer containing both mercaptan groups and acyloxy structures, the reaction would produce inter-molecular and intra-molecular thioester groups which would result in polymer bulk viscosities considerably higher than the original polymer.

The thioester-containing liquid polymers do not have the typical offensive odor of mercaptan-containing compounds. This renders them useful as base polymers for sealants, caulks, adhesives, potting compounds, and like formulations which are to be used in enclosed or confined areas where the odor of mercaptan-containing polymers might prohibit their use. The thioester-containing polymers can also be used in typical applications where mercaptan-containing polymers are used.

The thioester-containing polymers prepared from mercaptan-containing liquid polymers which also contained acyloxy structures can be vulcanized using primary and secondary polyfunctional amines (amines containing at least two N atoms) only. Examples of useful polyfunctional amines are ethylenediamine, 1,6-hexanediamine, pentamethylenediamine, N-methylethyldiamine, tetraethyl methylenediamine, triethylene tetraamine, tetraethylene pentaamine, and the like. These amines are used in amounts ranging from about 1 mole of amine such as (—$NH_2$) and/or

to every 1 mole of thioester to about 5 moles of amine to every 1 mole of thioester. Levels used over 5 moles of amine to every 1 mole of thioester are not necessary to obtain a satisfactory cure of the polymer.

Thioester-containing liquid polymers can be vulcanized using primary or secondary monofunctional amines (amines containing only one N atom), primary or secondary polyfunctional amines (amines containing at least two N atoms), alcohols where the total number of carbon atoms does not exceed 20, or water, in combination with a known curative agent for mercaptan-containing liquid polymers. Since water is not soluble in the thioester-containing liquid polymers and the hydrolysis to mercaptan groups is slow, and since the alcohols have only limited solubility in the polymers and the alcoholysis may result in low mercaptan yields, the preferred reaction is the aminolysis reaction between the thioester structures and the amines.

Useful primary and secondary polyfunctional amines and their levels of use are the same as described above.

Useful primary and secondary monofunctional amines include the aliphatic amines; the hydroxy-substituted aliphatic amines such as ethanolamine, diethanolamine, 2-amino-1-butanol, 2-amino-2-methyl-1-propanol, and the like; cyclic amines such as cyclohexyl amine, 3-methyl-1-aminocyclohexane, and the like; heterocyclic amines such as piperidine and morpholine; and aromatic amines such as benzyl amine and phenyl ethylamine. Preferred monofunctional amines are the aliphatic amines of the formula $$R-\underset{H}{N}-R'$$

wherein R is —H or an alkyl radical containing 1 to 8 carbon atoms, and R' is an alkyl group as defined for R.

The level of monofunctional amine used ranges from about 1 mole of amine as (—$NH_2$) and/or

to every 1 mole of thioester to about 5 moles of amine to every 1 mole of thioester. Levels of amine used over 5 moles to every mole of thioester to perform the aminolysis are not necessary.

Known curative agents for mercaptan-containing liquid polymers include oxidizing agents such as oxygen, permanganates, tertiary butyl perbenzoate, and organic and inorganic peroxides such as hydrogen peroxide, benzoyl peroxide, di-t-butyl hydroperoxide, and lead and zinc peroxide; metal oxides used with and without acidic accelerators such as lead oxide or lead oxide used with an organic acid such as acetic acid; di- and tri-acrylates such as trimethylolpropane triacrylate employing an amine catalyst such as 2,4,6-tri(dimethylaminomethyl)phenol; divinyl sulfones used with tertiary amine catalysts such as 1,2-bis(vinyl sulfone) ethane, vinyl sulfone, styryl sulfone, and the like used with trimethyl amine, triethylenediamine, N,N-dimethyl aniline, and the like; liquid dienic polymers such as those described within U.S. Pat. 2,964,502; diisocyanates such as tolylene diisocyanate and 4,4'-diisocyanato diphenylmethane; and aliphatic and aromatic epoxy resins employing an amine catalyst. Preferred epoxy resins are the aromatic diglycidol ethers of Bisphenol A and the epoxy-Novolac resins. Typical amine catalysts are 2,4,6-tri(dimethylaminomethyl)phenol, triethylene tetraamine, and aminoethyl piperazine.

The polymers can be compounded with ingredients known to the liquid polymer art such as fillers like clays, silicas, carbon black, $TiO_2$, asbestos, and the like; pigments; lubricants and plasticizers; and stabilizers and antioxidants. These ingredients may be mixed with the polymer using ink mills, bulk mixing equipment such as Henschel mixers, and the like.

The following examples further illustrate the invention. Ingredients used are in parts by weight unless otherwise indicated.

EXAMPLE I

An xanthate-terminated liquid acrylate polymer was prepared following the procedure of U.S. Pat. 3,580,830 wherein ethyl acrylate and normal butyl acrylate were polymerized together in the presence of diisopropyl xanthogen disulfide. The polymer was used to prepare thioester-containing liquid polymers following the recipes as given:

|  | 1 | 2 | 3 |
|---|---|---|---|
| Xanthate-terminated acrylate ploymer | 100 | 100 | 100 |
| Dodecyl benzene sulfonic acid |  | 2.5 | 8.0 |
| Temperature, ° C | 200 | 200 | 200 |
| Time, minutes | 20 | 60 | 45 |

The polymer and the dodecyl benzene sulfonic acid was charged to a reactor vessel equipped for agitation. The mix was heated to 200° C., under a vacuum, causing the xanthate groups to pyrolyze and form the mercaptan groups in situ. The mercaptan groups were then reacted with the pendant ester groups under the influence of the acid catalyst. The following data was obtained on the samples.

|  | 1 | 2 | 3 |
|---|---|---|---|
| Weight percent mercaptan | 1.8 | 0.22 | 0.12 |
| Bulk viscosity, cps | 17,000 | 46,000 | 32,000 |

Sample 1, pyrolyzed without any acid catalyst present, was a mercaptan-terminated acrylate polymer having a characteristic mercaptan odor. Samples 2 and 3, pyrolyzed in the presence of dodecyl benzene sulfonic acid, had no characteristic mercaptan odor as over 88% of the mercaptan groups of both samples were reacted to form thioester groups. The bulk viscosities on these two samples were considerably higher than in sample 1 due to the formation of inter- and intra-molecular thioester linkages. The example also demonstrates that the use of high acid catalyst levels yield polymers of low mercaptan levels in a faster time.

Mercaptan contents were determined by iodimetric titration to an end point. Bulk viscosities were determined at 27° C. using a Brookfield model LVT viscometer using spindle #7 at 20 r.p.m.

EXAMPLE II

Sample 2 of Example I was cured according to the following recipes:

|  | 2a | 2b | 2c | 2d | 2e |
|---|---|---|---|---|---|
| Thioester-containing polymer | 100 | 100 | 100 | 100 | 100 |
| Triethylene tetraamine | 5.0 | | | | |
| Ethylenediamine | | 4.0 | | | |
| 2-ethylhexylamine | | | 8.0 | 8.0 | |
| Epon 828 [1] | | | 13.5 | 13.5 | 5.0 |
| 2,4,6-tri(dimethylaminomethyl)phenol | | | 1.3 | | 1.0 |
| Aminoethyl piperazine | | | | 1.4 | |

[1] Diglycidol ether of Bisphenol A.

|  | 2a [1] | 2b [2] | 2c [3] | 2d [4] | 2e [5] |
|---|---|---|---|---|---|
| Cured properties: | | | | | |
| Surface | Dry | Dry | Dry | Dry | Fluid |
| Hardness, Durometer A | 18 | | | | |
| Percent elongation | 90 | 200 | 600 | | |

[1] 7 days at room temperature.
[2] 16 hours at 80° C.
[3] 16 hours at 120° C.
[4] 6 days at room temperature.
[5] 7 days at room temperature.

NOTE.—Samples 2a and 2b are examples of polyfunctional amine cures of thioester polymers made from mercaptan-containing polymers which also contained acyloxy structures. Samples 2c and 2d demonstrate that these polymers can also be cured using a monofunctional amine with a typical mercaptan cure system to cross-link the polymer molecules. Sample 2e shows that the mercaptan cure system will not vulcanize the polymer unless a primary or secondary amine is present.

EXAMPLE III

The mercaptan-terminated acrylate polymer prepared in Example I as sample 1 was used to prepare a thioester-terminated liquid acrylate polymer. The recipe used was:

| Mercaptan-terminated acrylate polymer | 100 |
|---|---|
| Acetic anhydride | 7.4 |
| Toluene | 100 |
| Dodecyl benzene sulfonic acid | 1.0 |

The mercaptan-terminated polymer was dissolved in the toluene and charged to a reactor vessel. The dodecyl benzene sulfonic acid was added, the vessel purged with nitrogen gas, and the acetic anhydride added as the solution was heated to 110° C. The solution was then refluxed for 1.25 hours. After cooling, the solution was mixed twice with water at a 5 to 1 water to solution volume ratio, and the resultant solution dried down under a vacuum to recover the polymer. The measured mercaptan content of the polymer was 0%, and the polymer had no characteristic mercaptan odor.

EXAMPLE IV

The thioester-terminated liquid acrylate polymer prepared in Example III was cured according to the following recipes:

|  | 1 | 2 |
|---|---|---|
| Thioester-terminated acrylate polymer | 100 | 100 |
| 2-ethylhexyl amine | 4.5 | 4.5 |
| Epon 828 | 13.5 | |
| Epon 152 [1] | | 13.5 |
| 2,4,6-tri(dimethylaminomethyl)phenol | 1.4 | 1.4 |

[1] Epoxy-novolac resin.

After 14 days at room temperature, sample 1 had a soft, dry surface and a 550% elongation, and sample 2 had a soft, dry surface and a 125% elongation.

EXAMPLE V

A mercaptan-terminated butadiene-acrylonitrile liquid polymer was prepared following the procedure of U.S. Pat. 3,449,301. First, an xanthate-terminated polymer was prepared by polymerizing together butadiene and acrylonitrile in the presence of diisopropyl xanthogen disulfide to over 60% conversion of monomers, and then the xanthate-terminated polymer was pyrolyzed at 180° C. for 35 minutes to form the mercaptan product. The polymer had a bulk viscosity of 35,000 cps., a 3.29% by weight mercaptan content, and a 22.3% by weight acrylonitrile content as determined by $N_2$ analysis using the Kjehldahl method. It was used in the following recipe to prepare a thioester-terminated butadiene-acrylonitrile liquid polymer.

| Mercaptan-terminated butadiene-acrylonitrile polymer | 100 |
|---|---|
| Toluene | 100 |
| Propionic acid | 11.0 |
| Dodecyl benzene sulfonic acid | 1.0 |

The polymer was dissolved in toluene and charged to a reactor vessel equipped for agitation. The propionic acid and dodecyl benzene sulfonic acid were added and the temperature raised to the reflux temperature of toluene, about 110° C. The solution was then held at reflux for 5.0 hours while being agitated. The product was recovered by coagulating the polymer solution with a 1 to 1 volume of isopropyl alcohol. The recovered polymer was washed twice with isopropyl alcohol prior to drying at 90° C. under a vacuum. The following data was determined on the polymer:

Percent mercaptan content:
  Prior to reaction _____ 3.29
  After reaction _____ 2.22
Bulk viscosity, cps.:
  Prior to reaction _____ 35,000
  After reaction _____ 73,000

Under the conditions of the reaction only about 33% of the mercaptan groups were reacted with the carboxylic acid to form thioester groups. Longer times and/or higher temperatures were needed to achieve about 90% conversion of mercaptan groups. The polymer still retained a characteristic mercaptan odor.

EXAMPLE VI

A mercaptan-terminated butadiene-acrylonitrile liquid polymer was prepared following the procedure in Example V. The polymer had a bulk viscosity of 36,000 cps., a 3.22% by weight mercaptan content, and a 22.3% by weight acrylonitrile content. A thioester-terminated liquid butadiene-acrylonitrile polymer was prepared from this polymer using the following recipe:

| Mercaptan-terminated BD-VCN polymer | 100 |
|---|---|
| Toluene | 150 |
| Acetic anhydride | 11.0 |
| Dodecyl benzene sulfonic acid | 1.0 |

The polymer was dissolved in toluene and it along with the acetic anhydride and the dodecyl benzene sulfonic acid was charged to the reactor vessel. The vessel was purged with nitrogen gas and sealed. The solution was heated to 100° C. and agitated. At 5.0 hours into the reaction an additional 2.2 parts by weight of acetic anhydride was added to the solution. Total reaction time was 6.5 hours. The following table shows the conversion of mercaptan groups to thioester groups with time.

| Reaction time, hours | 0.0 | 1.5 | 2.5 | 4.5 | 5.5 | 6.5 |
|---|---|---|---|---|---|---|
| Percent mercaptan content in polymer | 3.22 | 2.33 | 1.77 | 0.91 | 0.74 | 0.27 |
| Percent conversion of mercaptan groups | 0.0 | 28 | 45 | 69 | 77 | 92 |

The thioester-terminated polymer was recovered by placing the solution under a vacuum and heating to distill off the toluene and unrecated acetic anhydride. The bulk viscosity of the recovered polymer was 58,000 cps. Under the conditions of the reaction, the acetic anhydride readily reacted with the mercaptan groups to form thioester groups and, thereby, render the polymer free of its characteristic odor.

EXAMPLE VII

The thioester-terminated butadiene-acrylonitrile liquid polymer prepared in Example VI was cured according to the following recipes:

|  | 1 | 2 |
|---|---|---|
| Thioester-terminated polymer | 100 | 100 |
| 2-ethylhexyl amine | 7.0 | 6.0 |
| Epon 828 | 22.5 | 22.5 |
| 2,4,6-tri(dimethylaminomethyl)phenol | 2.2 | 2.2 |

After 6 days at room temperature both samples had a dry surface. Sample 1 had a 1300% elongation and a Durometer A hardness of 9. Sample 2 had a 1000% elongation and a Durometer A hardness of 7.

While the examples show use of acid catalysts which generally provide fast reactions, the reactions can be conducted without catalysts, for example, when acid anhydrides and the like are a reactant. Other useful catalysts, if a catalyst is required for rapid reaction, include bases as pyridine, piperidine; amides including acetamide, benzamide, and like nitrogen compounds; amine hydrochlorides and the like.

The thioester-containing liquid polymers, formulated with fillers as clays, silicas, asbestos, and $TiO_2$ and with plasticizers as the commercially sold Aroclor 6062, Chlorowax 40, and Benzoflex 9–88 and commercial oils as Mobilsol 66, are useful caulks for filling cracks and crevices between stone, brick, and concrete; sealants for aluminum, steel, ceramic and concrete to glass junctions; potting compounds for electrical components; and adhesives for wood to wood joints. They can be readily used in applications where the offensive odor of mercaptan-containing polymers phohibits their use.

I claim:

1. A liquid thioester-terminated polymer having a thioester content from about 0.2 percent to about 70 percent by weight based upon the weight of the polymer, wherein the polymeric backbone consists of carbon-carbon linkages and is derived from vinylidene monomers selected from the group consisting of conjugated dienes, monoolefins, monoolefinically unsaturated nitriles, vinyl esters, vinyl ethers, allyl esters, allyl ethers, and acrylates.

2. A polymer of claim 1 wherein the liquid thioester-terminated polymer is a polymer wherein the polymeric backbone is derived from at least one acrylate monomer of the formula

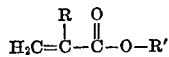

wherein R is —H, —$CH_3$, or —$C_2H_5$ and R' is selected from the group consisting of an alkyl radical containing 1 to 18 carbon atoms and an ether radical containing no more than 5 carbon atoms.

3. A polymer of claim 2 wherein the polymeric backbone consists of from about 11 percent to about 61 percent by weight of ethyl acrylate, about 4 percent to about 88 percent by weight of an acrylate of the formula

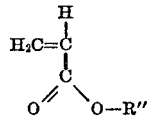

wherein R" is an alkyl radical of 1 to 8 carbon atoms, and the thioester content is from about 1 percent to about 9 percent by weight, all based upon the weight of the polymer.

4. A polymer of claim 3 wherein the polymeric backbone consists of from about 11 percent to about 24 percent by weight of ethyl acrylate and about 54 percent to about 75 percent by weight of normal butyl acrylate, and the thioester content is from about 1 percent to about 9 percent by weight of thioester.

5. A polymer of claim 1 wherein the liquid thioester-terminated polymer is a polymer wherein the polymeric backbone consists of from about 15 percent to about 94 percent by weight of butadiene and about 5 percent to about 37 percent by weight of acrylonitrile, and the thioester content is from about 1 percent to about 12 percent by weight, all based upon the weight of the polymer.

6. A polymer of claim 1 in a cured state wherein the curative is a primary or secondary polyfunctional amine.

7. A process for preparing liquid thioester-terminated polymers, having a weight percent thioester content of from about 0.2 percent to about 70 percent by weight based upon the weight of the polymer, by reacting a liquid mercaptan-terminated polymer having a weight percent mercaptan content of from about 0.2 percent to about 10 percent based upon the weight of the polymer and having a polymeric backbone consisting of carbon-carbon linkages derived from vinylidene monomers selected from the group consisting of conjugated dienes, monoolefins, monoolefinically unsaturated nitriles, vinyl esters, vinyl ethers, allyl esters, allyl ethers, and acrylates, with an acyloxy compound selected from the group consisting of anhydrides of the formula

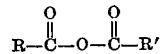

wherein R and R' are alkyl, aryl, alkaryl, aralkyl, alkoxy, or cycloalkyl, groups containing 1 to 12 carbon atoms, esters of the formula

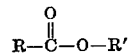

wherein R and R' are defined as above, and carboxylic acids of the formula

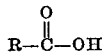

8. A process of claim 7 wherein the said anhydrides, esters, and carboxylic acids contain a total of 2 to 12 carbon atoms.

9. A process of claim 7 wherein the polymeric backbone is derived from at least one acrylate monomer of the formula

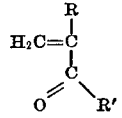

wherein R is —H, —$CH_3$, or —$C_2H_5$ and R' is selected from the group consisting of an alkyl radical containing 1 to 18 carbon atoms and an ether radical containing no more than 5 carbon atoms, and butadiene.

10. A method of vulcanizing a liquid thioester-terminated polymer having a thioester content of from about 0.2 percent to about 70 percent by weight based upon the weight of the polymer wherein the polymeric backbone consists of carbon-carbon linkages derived from vinylidene monomers selected from the group consisting of conjugated dienes, monoolefins, monoolefinically unsaturated nitriles, vinyl esters, vinyl ethers, allyl esters, allyl ethers, and acrylates, comprising reacting the polymer with an amine having at least one nitrogen atom containing at least one hydrogen atom, said amine being used in the range from about 1 mole to about 5 moles of amine to every one mole of thioester, and a liquid mercaptan-containing polymer curative agent.

11. A process of preparing a liquid thioester-containing polymer comprising (1) heating a liquid mercaptan-terminated polymer having a mercaptan content of from about 0.2 percent to about 10 percent by weight based upon the weight of the polymer and having a polymeric backbone consisting of at least one acrylate monomer of the formula

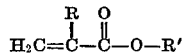

wherein R is —H, —CH$_3$, or —C$_2$H$_5$, and R' is selected from the group consisting of an alkyl radical containing 1 to 18 carbon atoms and an ether radical containing no more than 5 carbon atoms, to a temperature from about 20° C. to about 260° C. in the presence of about 0.1 part to about 10 parts by weight of an acid catalyst based on 100 parts by weight of said mercaptan-terminated polymer and (2) recovering the product.

12. A method of curing a polymer of claim 11 comprising reacting the polymer with an amine having at least two nitrogen atoms which have at least one hydrogen atom on the nitrogen atom, said amine being used in the range from about 1 mole to about 5 moles of amine to every 1 mole of thioester.

References Cited
UNITED STATES PATENTS

| | | | |
|---|---|---|---|
| 3,332,914 | 7/1967 | Costanza | 260—79 |
| 3,254,061 | 5/1966 | Martin et al. | 260—79 |
| 3,580,830 | 5/1971 | Siebert | 204—159.24 |

DONALD E. CZAJA, Primary Examiner

M. I. MARQUIS, Assistant Examiner

U.S. Cl. X.R.

161—182, 187, 204, 218; 260—33.8 UA, 41 A, 41 B, 41 C, 77.5 CR, 79.5 R, 79.5 C, 830 S

UNITED STATES PATENT OFFICE
CERTIFICATE OF CORRECTION

Patent No. 3,705,882                     Dated December 12, 1972

Inventor(s)  Douglas E. Skillicorn

It is certified that error appears in the above-identified patent and that said Letters Patent are hereby corrected as shown below:

Column 4, line 19, "Anyhdrides" should read --Anhydrides--.

Column 6, line 65, "ploymer" should read --polymer---.

Column 9, line 53, "phohibits" should read --prohibits--.

Column 10, line 54, Claim 7, after the last formula, insert -- wherein R is defined as above, used in the range from about 1 mole to about 10 moles of acyloxy compound to every 1 mole of mercaptan, said reaction being carried out in the temperature range from about 20°C. to about 260°C.--

Signed and sealed this 9th day of April 1974.

(SEAL)
Attest:

EDWARD M.FLETCHER,JR.                C. MARSHALL DANN
Attesting Officer                    Commissioner of Patents